UNITED STATES PATENT OFFICE.

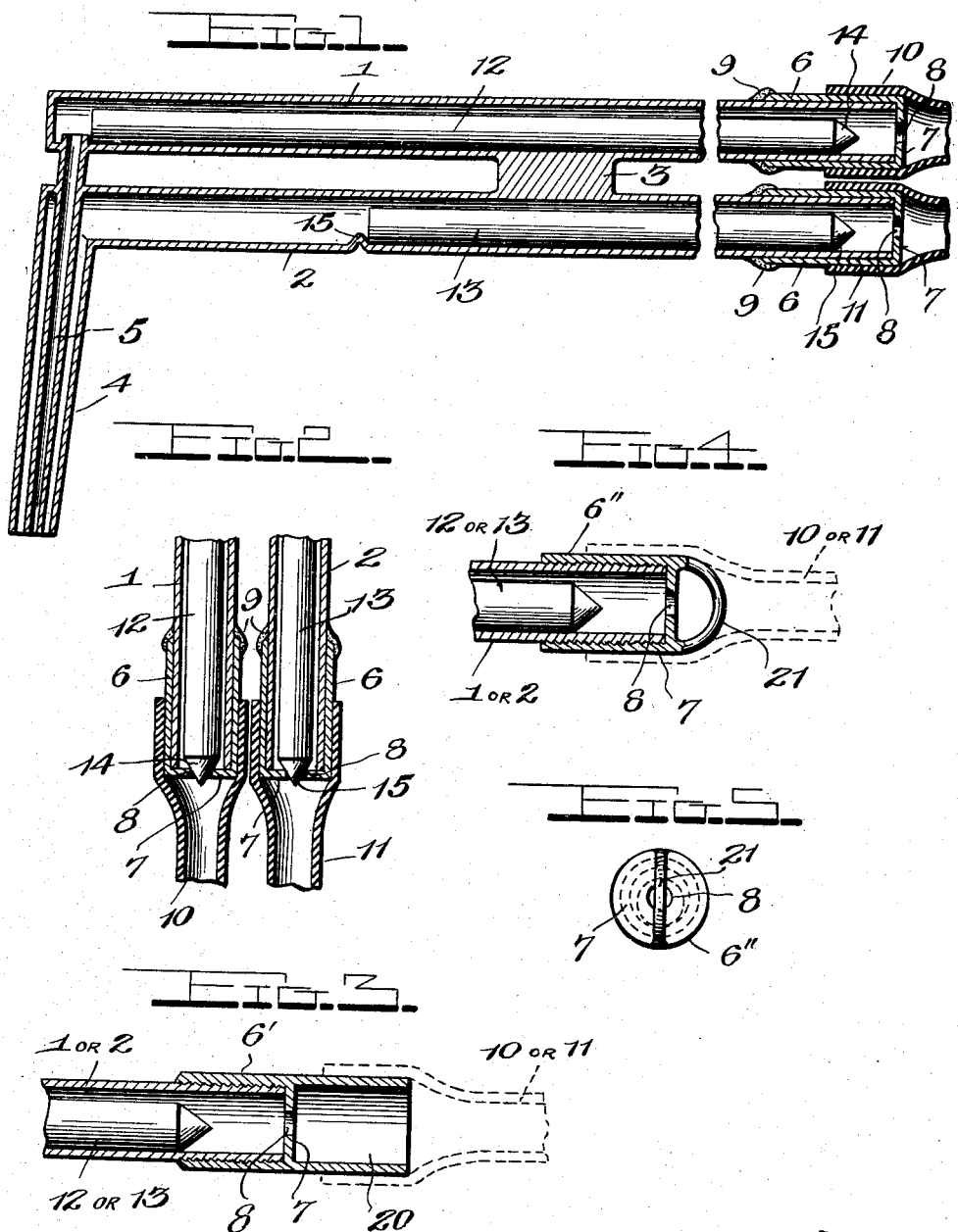

JAMES ASLIN, OF PROVIDENCE, RHODE ISLAND.

BLOWPIPE.

1,227,104.  Specification of Letters Patent.  Patented May 22, 1917.

Application filed February 15, 1917. Serial No. 148,768.

*To all whom it may concern:*

Be it known that I, JAMES ASLIN, a citizen of the United States, residing at Providence, in the county of Providence and State of Rhode Island, have invented a new and useful Improvement in Blowpipes, of which the following is a specification.

This invention relates to certain new and useful improvements in blow pipes, and the primary object of the invention is to provide a blow pipe which is equipped with means for shutting off the supply of air and gas by a mere change in the position of the blow pipe, and more specifically to shut off the flow by tilting the blow pipe from a horizontal or downwardly directed position, to an upwardly directed position.

The invention in brief resides in the provision of gravity controlled valves which when held horizontal or directed downwardly beyond the horizontal will be held open and which will automatically respond to the action of gravity upon being directed above the horizontal, to thereby automatically effect closure of the valves.

Further, the invention aims to generally simplify and economize in the cost of production of devices of this type, and to eliminate parts, to thus decrease the complexity and simplify the operation.

In the drawings—

Figure 1 is a longitudinal sectional view of the invention.

Fig. 2 is a fragmentary like view, showing the valves closed as distinguished from the open position shown in Fig. 1.

Fig. 3 is a detail view of a modified form of valve seat.

Fig. 4 is a similar view of a further modified form of valve seat and gas or air supply pipe connection.

Fig. 5 is an end view of Fig. 4.

In proceeding in accordance with the present invention, a pair of pipes 1 and 2 are employed and disposed in parallelism, and connected in any suitable manner as indicated at 3, so as to be maintained in their said relation. The pipe 1 is the gas pipe and the pipe 2 the air pipe, the former having a discharge tube, or nozzle 5 secured thereto and extending out at an angle, while the air pipe has a similar tube or nozzle 4, which surrounds the nozzle 5 in spaced relation thereto.

Secured over the inner ends of the pipes 1 and 2 are similar sleeves 6, and since same are identical in structure, a description of one will suffice for the other. Each sleeve is open at its inner end and is slipped over the pipes 1 or 2 and secured thereto by solder at 9. The sleeves have closed outer ends effected by the provision of walls 7, the latter being centrally perforated at 8, and received over the sleeves are rubber pipes or tubes 10 and 11, which lead to the respective gas and air sources of supply.

Freely mounted in the pipes 1 and 2 are the gravity valves 12 and 13 respectively, each preferably in the form of a solid rod, pointed at 14 and 15, to form valves. The rods are made solid so as to possess weight and thus to more readily and quickly respond to the action of gravity, and since the valves 14 and 15 are of cone-like formation, it will be apparent that upon their encountering the perforation the rods will be centered by the walls defining such perforations and thus be firmly and uniformly seated to close the perforations.

Rod 13 is of less length than 12, though this is not essential or necessary, and is preferably stopped during its outward movement by the provision of a suitable stop 15, here shown in the form of a teat punched up from the pipe 2. This enables the air to freely enter nozzle 4, the rods being formed of less diameter than that of the pipes 1 and 2, so as to allow the air and gas to freely pass same and enter the nozzles.

Fig. 2 shows the parts in vertical position effecting complete closure of the ports provided by the perforations 8.

Fig. 3 depicts a modified form of sleeve 6' which is threaded onto pipes 1 or 2, and has an extension 20 to receive the gas or air supply pipe 10 or 11, while in Figs. 4 and 5, the sleeve 6'' is equipped with a wire loop 21, the latter assisting in threading the rubber tubes 10 or 11 over the sleeve, and also to protect the wall 7.

From the foregoing it will be apparent that when the device is held in the position of Fig. 1, or with the pipes 1—2 below the horizontal at the outer ends thereof, the valves will remain open or unseated, though permitting of a circular movement of the nozzles for any desired purpose without closing, but as soon as the pipes 1 and 2 are tilted out of the horizontal the valves will instantly gravitate to closed position, shutting off the air and gas at one and the same time. It will be further apparent that by slipping off the rubber tubes 10 and 11, the valve seats may be cleaned with a pin or the like, since they appear at the ends of the pipes 1 and 2 and hence are readily accessible for the purpose just mentioned.

The inner end of the nozzle 5 projects into its tube 1 and thus serves as a stop for the valve rod 12.

Having thus described my invention, what I claim as new and desire to secure by Letters Patent is—

1. In a blow pipe, a pair of parallel pipes, a nozzle secured to one pipe and projecting into the interior thereof to form a stop, a nozzle secured to the other pipe and surrounding the first nozzle in spaced relation thereto, sleeves on the inner ends of the pipes having transverse walls centrally perforated, and adapted for connection with supply pipes, valve rods sliding in the pipes and each having a cone pointed end for engagement in said wall perforations, one of the valves being engageable with said stop on said pipe to limit the extent of the sliding thereof and the other pipe having a stop to engage its rod to limit sliding of the latter.

2. In combination with an air pipe and a gas pipe connected thereto, nozzles connected to the respective pipes, slidable rods in the pipes having cone-valve ends, end walls formed with perforations to receive said valve ends, and tubes secured over the pipes adjacent said end walls so as to permit access to the perforations thereof upon removal of the tubes.

3. In a blow pipe, air and gas pipes having discharge nozzles, a valve seat in each pipe, stops between the nozzles and valve seats, and relatively long heavy rods slidable in said pipes and having valves formed on one end to engage in said valve seats and having their opposite ends engageable with said stops.

4. In a blow pipe, an air pipe having a nozzle, a gas pipe arranged substantially parallel to the air pipe and connected thereto and having a nozzle extending across the space between the pipes and through the air pipe nozzle and connected to the air pipe, and independent gravity valves in the respective pipes for simultaneously controlling the supply of air and gas thereto.

5. In a blow pipe, an air pipe having a nozzle, a gas pipe arranged alongside of the air pipe, telescoping nozzles borne by the respective pipes, and independent gravity valves in the respective pipes for simultaneously controlling the supply of air and gas thereto.

6. In a blow pipe, air and gas pipes having discharge nozzles, and gravity controlled relatively long and heavy single rods slidable in said respective pipes having valves formed on one end for simultaneously controlling the supply of air and gas thereto.

7. In a blow pipe, air and gas pipes, and a gravity controlled relatively long and heavy single rod in the gas pipe having a valve formed on one end for controlling the supply of gas thereto.

In testimony whereof I have signed my name to this specification in the presence of two subscribing witnesses.

JAMES ASLIN.

Witnesses:
ADA E. HAGERTY,
J. A. MILLER.

Copies of this patent may be obtained for five cents each, by addressing the "Commissioner of Patents, Washington, D. C."